Nov. 8, 1960     G. W. STANTON ET AL     2,959,565
COMPOSITIONS COMPRISING GRAFT COPOLYMERS OF CERTAIN
MONOMERIC POLYGLYCOL ESTERS OF ACRYLATES AND
METHACRYLATES ON SUPERPOLYAMIDE SUBSTRATES
Filed Jan. 29, 1958

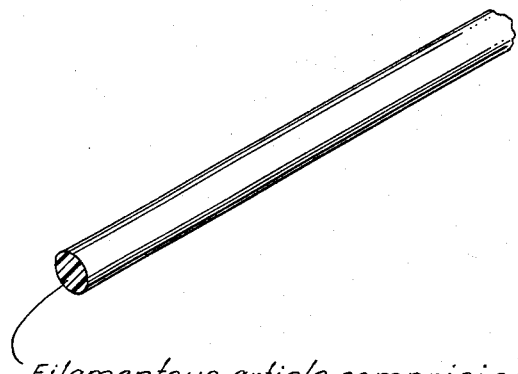

Filamentous article comprising a graft copolymer of certain monomeric polyglycol esters of acrylates and methacrylates on a superpolyamide polymer substrate.

INVENTORS.
George W. Stanton
Teddy G. Traylor
BY
Griswold & Burdick
ATTORNEYS

United States Patent Office

2,959,565
Patented Nov. 8, 1960

2,959,565

COMPOSITIONS COMPRISING GRAFT COPOLYMERS OF CERTAIN MONOMERIC POLYGLYCOL ESTERS OF ACRYLATES AND METHACRYLATES ON SUPERPOLYAMIDE SUBSTRATES

George W. Stanton, Walnut Creek, and Teddy G. Traylor, Concord, Calif., assignors to The Dow Chemical Company, Midland, Mich., a corporation of Delaware Filed Jan. 29, 1958, Ser. No. 711,938

5 Claims. (Cl. 260—45.5)

The present invention lies generally in the field of organic chemistry and contributes in particular to the art which pertains to synthetic, fiber-forming high polymers. More particularly, the present invention has reference to the provision of certain readily-dyeable graft or block-type copolymers that are comprised of certain monomeric polyglycol esters of acrylates and methacrylates, as hereinafter more fully delineated, polymerized on superpolyamide polymer substrates.

Hydrophobic polymeric materials of varying origin are commonly employed in the manufacture of various synthetic shaped articles including films, ribbons, fibers, filaments, yarns, threads and the like and related structures, which hereinafter will be illustrated with particular reference to fibers. Superpolyamide polymers may be utilized with great advantage for such purposes.

The fiber-forming linear superpolyamide polymers that are contemplated as being adapted for employment as polymer substrates in the practice of the present invention include any of the thermoplastic resinous products that are obtained from the condensation between dicarboxylic acids and diamines or their equivalents, as well as those that may be prepared from such monomeric derivatives as the epsilon lactam derivatives of certain amino carboxylic acids, particularly those that are generically characterized as being "nylons," by which term such superpolyamide polymers will hereinafter be referred to. Advantageously, the nylon substrate that is utilized may be the fiber-forming resinous condensation product of hexamethylene-diamine and adipic acid, such as the commercially available material of this type which is frequently referred to as being "nylon 6-6"; or the also commercially available fiber-forming condensation products of epsilon caprolactam, such as the superpolyamide product of this type that is variously referred to as "nylon 6" or "Perlon."

Difficulty is often encountered, however, in suitably dyeing synthetic hydrophobic fibers and the like that have been prepared from such superpolyamide (or, more simply, polyamide) polymers. This is especially the case when it is attempted to obtain relatively deeper shades of coloration in the finally dyed product, and is particularly true when certain varieties of dyestuffs, such as basic dyes, are involved.

Various techniques have been evolved for providing superpolyamide polymer compositions of improved dyeability. The practice of such techniques has not always been completely satisfactory. Neither have the products thereby achieved always provided a completely suitable solution to the problems involved. For example, many of the fiber products which are prepared in accordance with the above-identified techniques known to the art often have inferior properties and characteristics when they are compared with those prepared from unmodified superpolyamide polymers. Furthermore such products, once they have been prepared, may not be as receptive as might be desired to a wide range of dyestuffs, due to inherent limitations in the materials capable of being employed for enhancing dye-receptivity.

It would be advantageous, and it is the chief aim and concern of the present invention, to provide superpolyamide polymers which have been modified with certain graft or block copolymerized substituents so as to be exceptionally dye-receptive, especially of basic type dyestuffs, while being capable of being fabricated into fibers and the like and related shaped articles having excellent physical properties and other desirable characteristics commensurate with those obtained with the unmodified superpolyamide polymer substrates, and of the general order obtainable, for example, with "nylon 6-6" or "nylon 6." This would possibilitate the manufacture of superpolyamide polymer based fibers and the like articles having the highly desirable combination of attractive physical characteristics and substantial capacity for and acceptance of dyestuffs.

To the attainment of these and related ends, a dye-receptive superpolyamide polymer composition that is adapted to provide shaped articles having excellent physical properties and characteristics while being simultaneously receptive of and dyeable to deep and level shades of coloration with basic dyes as well as many others of a wide variety of dyestuffs is, according to the present invention, comprised of a fiber-forming graft or block copolymer which consists of a superpolyamide polymer substrate having a minor proportion of substituents graft copolymerized thereto that are comprised of or consist essentially of polymerized units that have been derived from the indicated varieties of monomers. Schematically, the compositions may be structurally represented in the following manner:

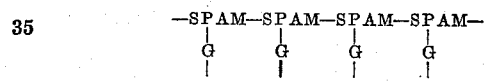

wherein the interlinked "SPAM" symbols represent the superpolyamide polymer substrate or trunk and the symbols "G" connected thereto the substituent graft copolymer branches of the monomeric polyglycol ester of an acrylate or methacrylate provided thereon.

As is apparent, the graft copolymer substituent that is combined with the superpolyamide polymer substrate lends the desired receptivity of and substantivity for various dyestuffs to the compositions while the superpolyamide polymer trunk substrate that is so modified facilitates and secures the excellent physical properties and characteristics of the various shaped articles, including fibers, into which the compositions may be fabricated. Advantageously, as mentioned, the superpolyamide polymer substrate that is modified by graft copolymerization to provide the compositions of the invention is "nylon 6-6," although "nylon 6" substrates may also be utilized with great advantage.

It is usually beneficial, as has been indicated, for the graft copolymer compositions of the present invention to contain a major proportion of the superpolyamide polymer trunk or substrate that has been modified with the substituent, dye-receptive, graft copolymer groups chemically attached thereto. As a general rule, for example, it is desirable for the graft copolymer to be comprised of at least about 80 percent by weight of the superpolyamide polymer substrate. In many instances, it may be satisfactory for the graft copolymer compositions to be comprised of between about 85 and 95 percent by weight of the superpolyamide polymer substrate, particularly when it is "nylon 6—6" or "nylon 6." In this connection, however, better dyeability may generally be achieved when the grafted copolymeric substituents are prepared under such conditions that they have relatively long chain lengths. Thus, it is usually preferable, when identical quantities of grafted substituents are involved for relatively fewer, but longer chain length grafts to be available then to have a greater number of substituents of relatively shorter chain length.

The monomers which are utilized to modify the superpolyamide polymer substrates so as to provide the graft copolymer compositions of the present invention may be any of the monomeric polyglycol esters of acrylates or methacrylates, or their mixtures, of the formulae:

$$Ak(OC_2H_4)_n(OC_3H_6)_mX \qquad (I)$$

and $$Ak(OC_2H_4)_nX \qquad (II)$$

wherein Ak is selected from the group consisting of acryloyl and methacryloyl radicals (i.e., $CH_2=CZCO-$, in which Z is hydrogen or methyl); X is selected from the group consisting of the halogens of atomic number 17 to 53 (i.e., chlorine, bromine and iodine) as well as methoxy radicals ($-OCH_3$), ethoxy radicals ($-OC_2H_5$), thiomethyl radicals ($-SCH_3$) and thioethyl radicals ($-SC_2H_5$); $n$ has an average numerical value from 5 to 200; and $m$ has an average positive numerical value between 0 and 10 with the limitation that the value of $m$ cannot exceed ½ $n$. Typical of such a monomer is a polyethylene glycol methyl ether methacrylate derived from a polyoxyethylene glycol having an average molecular weight of 500–600 or so.

If desired, the monomeric polyethylene glycol esters of acrylates or methacrylates which are adapted to be employed in the practice of the present invention may be utilized in combinations or mixtures with other varieties of monomers in order to prepare mixed graft copolymers having specific properties and effects, particularly with respect to their capability for accepting greater numbers of different types of dyestuffs. To illustrate, they may be mixed with such monomers as the vinyl lactams; various monomeric vinyl group-containing organic sulfonic acid compounds; vinyl pyridines; aminated vinyl aromatic monomers; aminated acrylate and methacrylate monomers, etc. The sulfonated monomers ordinarily provide graft copolymers showing excellent acceptance of basic dyestuffs. On the other hand, the nitrogen containing monomers, i.e., the vinyl pyridine and the aminated monomers, usually provide graft copolymers that exhibit good acceptance of direct or acid type dyestuffs. Thus, mixtures of such diverse types of monomers may frequently be utilized in beneficial combination with one another in order to enhance the general dye-receptivity of the resulting product.

As mentioned, the graft copolymer compositions of the invention have remarkably good dye-receptivity, especially of basic dyestuffs, particularly in view of their superpolyamide polymer origin. In most cases, for example, the dye-receptivity of the graft copolymer compositions of the present invention is improved to such an extent in comparison with unmodified superpolyamide polymers, particularly unmodified "nylon 6–6," that a color differential of at least about 30 Judd units, as hereinafter illustrated, may readily be obtained between samples of the unmodified superpolyamide polymer substrate and the graft copolymer compositions of the present invention, each of which have been dyed under identical conditions according to conventional techniques with any of the basic dyestuffs. This is a significant advantage when the compositions are fabricated into shaped article form, especially when they are prepared in a filamentary form suitable for use as a textile material.

The Judd unit is defined in the article by D. B. Judd in the "American Journal of Psychology," vol. 53, page 418 (1939). More applicable data appears in "Summary on Available Information on Small Color Difference Formulas" by Dorothy Nickerson in the American Dyestuff Reporter, vol. 33, page 252, June 5, 1944. Also see "Interrelation of Color Specifications" by Nickerson in "The Paper Trade Journal," vol. 125, page 153 for November 6, 1947.

Besides having excellent physical properties and other desirable characteristics, fibers and the like articles comprised of the present compositions similarly have the indicated high capacity for being readily and satisfactorily dyed to deep and level shades of coloration with many dyestuffs in addition to basic dyestuffs. For example, fibers of the present compositions may be easily and successfully dyed according to conventional procedures using acid, vat, acetate, naphthol, and sulfur dyes.

The dye-receptive graft copolymers of the present invention may be prepared and provided by impregnating the polymer substrate with the monomeric substance then polymerizing the monomer in situ in the polymer substrate. Advantageously, this may be accomplished when the substrate is in the form of an already shaped article, such as a fiber of filamentary structure. Beneficially, the graft copolymerization of the impregnated monomer may be accomplished and facilitated with the assistance of a polymerization catalyst or catalyzing influence which, preferentially, interacts with the substrate in order to establish or form grafting sites thereon and simultaneously or subsequently initiate the graft copolymerization. As a practical matter, it is generally most desirable to form the graft copolymer compositions in such manner. Most of the free radical generating chemical catalysts, including peroxide and persulfate catalysts, may be utilized for the desired graft copolymerization. It may often be exceptionally advantageous, however, to accomplish the graft copolymerization by subjecting the monomer-impregnated superpolyamide polymer substrate to a field of high energy radiation in order to efficiently provide an effectively attached graft copolymer of the polymerized monomeric impregnate on the hydrophobic superpolyamide polymer substrate.

The monomer may be intimately impregnated in the superpolyamide polymer substrate in any desired manner prior to the graft copolymerization. Thus, the monomer may be directly applied, particularly when it has a swelling effect on the substrate, or it may be applied from dispersion of solution in suitable liquid vehicles, preferably those tending to swell the polymer, until a desired monomer content has been obtained. Ordinarily, it is advantageous for the monomer to be diluted in a solvent or dispersant vehicle so as to provide a treating bath in which to swell or impregnate the superpolyamide polymer substrate with the latter being immersed in the bath for a sufficient period of time to attain a desired monomer content adequate for the intended purpose. The superpolyamide polymer substrate, as has been mentioned, may be in any fabricated or unfabricated form. Unfabricated graft copolymer compositions in accordance with the present invention may be converted to shaped articles by any desired technique adapted for such purpose with conventional polymers. It is generally desirable and of significant advantage, however, to impregnate a preformed article, such as a textile fiber of the superpolyamide polymer (or a cloth or fabric comprised thereof) with the monomer in order to prepare the graft copolymer compositions of the invention.

In this connection, particularly when preformed fiber structures are involved, the article may be in any desired state of formation for the impregnating and graft copolymerizing modification. Thus fibers and films may be treated before or after any stretch has been imparted thereto. In addition, they may be in various stages of orientation, or in a gel, swollen or dried condition.

The impregnation and succeeding polymerization may, in general, be effected at temperatures between about 0° C. and about 200° C. for periods of time ranging up to 4 or more hours. The most suitable conditions in each instance may vary according to the nature and quantity of the specific monomeric impregnant involved and the graft copolymerizing technique that is utilized. For example, when chemical catalysts are employed for purposes of forming the graft copolymer, a temperature of between about 50° and 100° C. for a period of time between about 15 and 45 minutes may frequently be advantageously employed for the purpose. Under the influence of high energy radiation, however, it may frequently be of greatest advantage to accomplish the graft copolymerization at temperatures between about 20 and 60° C. utilizing relatively low dose rates and total dosages of the high energy for the desired purpose. Graft copolymerization on preactivated substrates may ordinarily be accomplished by simply exposing the activated substrate to the monomer (preferably in concentrated solution) at an elevated temperature until the graft copolymerized substituents have formed on the substrate.

When the graft copolymer compositions are prepared from preformed or already shaped superpolyamide polymer substrates that are successively impregnated with the monomer, which is then graft copolymerized in situ in the shaped article, excess monomer, if desired, may be squeezed out or removed in any suitable manner prior to effecting the graft copolymerization.

The chemical free radical generating catalysts which may be employed with greatest advantage in the preparation of the graft copolymer compositions of the present invention include hydrogen peroxide, benzoyl peroxide, cumene hydroperoxide, ammonium or potassium persulfate and the like. Such catalysts may be used in conventional quantities to effect the graft copolymerization. When they are utilized, it is of greatest benefit to incorporate them in the impregnating solution of the monomer that is used.

The high energy radiation which may be employed for inducing the graft copolymerization for the preparation of the graft copolymers of the present invention is of the type which provides emitted particles or photons having an intrinsic energy of a magnitude which is greater than the planetary electron binding energies that occur in the graft copolymerizing materials. Such high energy radiation is available from various radioactive substances which provide beta or gamma radiation as, for example, radioactive elements including cobalt-60 and cesium-137, nuclear reaction fission products and the like. If it is preferred, however, high energy radiation from such sources as electron beam generators, including linear accelerators and resonant transformers, X-ray generators and the like may also be utilized. It is beneficial to employ the high energy radiation in a field of at least about 40,000 roentgens per hour intensity. A roentgen, as is commonly understood, is the amount of high energy radiation as may be provided in a radiation field which produces in one cubic centimeter of air at 0° C. and 760 millimeters of absolute mercury pressure, such a degree of conductivity that one electrostatic unit of charge is measured at saturation (when the secondary electrons are fully utilized and the wall effect of the chamber is avoided). It is most desirable, incidentally, to graft copolymerize all or substantially all of the monomeric impregnant to and with the fiber-forming, linear, superpolyamide polymer substrate being modified in order to provide the compositions of the present invention. In addition, as has been indicated, particularly when pre-activation of the substrate is performed, ultraviolet light may also be employed as the high energy radiation form. Pre-activation or graft site formation with oxygen and ultraviolet light or ozone may also be satisfactory in many instances.

For purposes of specifically illustrating, without intending to thereby limit the invention, the following example is provided wherein, unless otherwise indicated, all parts and percentages are to be taken by weight.

*Example*

"Nylon 6-6" staple fiber was scoured and soaked for 30 minutes in a 10 percent aqueous solution of a monomeric polyethylene glycol methyl ether methacrylate derived from a polyoxyethylene glycol of molecular weight 600. The wet fiber, containing about 10 percent of the monomer impregnated therein, was then exposed at a distance of about 1 centimeter from a Machlett OEG-50 tube that was being operated at 50,000 volts and 50 milliamperes. The exposure was continued for 25 minutes. The irradiated yarn was then washed thoroughly with water, dried, scoured and then dyed at the 2 percent level for one hour at the boil in Sevron Brilliant Red 4G, a basic dye formerly known as Basic Red 4G (Colour Index Basic Red 14). A deep red shade of coloration was obtained. In contrast, the unmodified yarn could be dyed to only the faintest degree with the same dyestuff. The graft copolymerized fiber product was also dyed well to deep and level shades of coloration with Amacel Scarlet BS, an acetate type of dyestuff (Colour Index Direct Red 1, also American Prototype Number 244).

Results similar to the foregoing may also be obtained when any other of the mentioned varieties of monomers of the Formula I are utilized in a similar manner in place of that set forth in the above example and when graft copolymers are prepared with such monomers on unfabricated forms of the superpolyamide polymer substrate or when the graft copolymerization is accomplished with other varieties of superpolyamide polymers besides those used for purposes of didactic illustration.

What is claimed is:

1. Dye-receptive graft copolymer composition comprised of (1) a fiber-forming synthetic linear polymeric carbonamide which contains recurring carbonamide groups as an integral part of the main polymer chain separated by at least 2 carbon atoms having chemically attached to carbon atoms therein up to about 20 weight percent, based on the weight of the composition, of substituent units consisting of (2) polymerized units of a monomer of the formula:

$$Ak(OC_2H_4)_nX$$

wherein Ak is selected from the group consisting of acryloyl and methacryloyl; X is selected from the group consisting of chlorine, bromine, iodine, methoxy, ethoxy, thiomethyl and thioethyl; and $n$ has a value of from about 5 to about 200.

2. The composition of claim 1, wherein said polymeric carbonamide substrate has between about 5 and 15 percent by weight, based on the weight of the composition, of said substituent graft copolymerized units attached thereto.

3. The composition of claim 1, wherein said polymeric carbonamide substrate is the resinous condensation product of hexamethylene diamine and adipic acid.

4. The composition of claim 1, wherein said polymeric carbonamide substrate is the resinous self-condensation product of epsilon caprolactam.

5. A filamentary shaped article comprised of the composition set forth in claim 1.

References Cited in the file of this patent

UNITED STATES PATENTS

| 2,688,008 | Chaney | Aug. 31, 1945 |
| 2,721,849 | Lytton | Oct. 25, 1955 |
| 2,841,567 | Blanton et al. | July 1, 1958 |

Notice of Adverse Decision in Interference

In Interference No. 92,145 involving Patent No. 2,959,565, G. W. Stanton and T. G. Traylor, Compositions comprising graft copolymers of certain monomeric polyglycol esters of acrylates and methacrylates on superpolyamide substrates, final judgment adverse to the patentees was rendered Nov. 22, 1963, as to claims 1, 3, 4 and 5.

[*Official Gazette December 22, 1964.*]